United States Patent Office 3,287,223
Patented Nov. 22, 1966

3,287,223
NONSTICKY ALUMINUM-CONTAINING
ANTIPERSPIRANT
Fred C. Theile, North Caldwell, and Peter Sgaramella, Pompton Plains, N.J., assignors to the United States of America as represented by the Secretary of Agriculture
No Drawing. Filed Mar. 10, 1964, Ser. No. 350,925
1 Claim. (Cl. 167—90)

A nonexclusive, irrevocable, royalty-free license in the invention herein described, throughout the world for all purposes of the United States Government, with the power to grant sublicenses for such purposes, is hereby granted to the Government of the United States of America.

This invention relates to antiperspirant compositions containing a conventional aluminum salt and an adjuvant which surprisingly prevents the objectionable sensation of clamminess or tackiness that usually accompanies or follows the application of an aluminum-containing antiperspirant to the axillary areas of the body.

More particularly, this invention relates to aluminum-containing antiperspirant compositions also comprising a minor proportion of a novel $C_{18}$ or $C_{20}$ saturated cyclic monohydric alcohol. These novel alcohols are fully disclosed and claimed in application S.N. 350,917 of Bell et al., filed of even date herewith.

The somewhat unpleasant sensation accompanying the use of antiperspirants containing aluminum compounds as the active perspiration inhibiting agent has long been observed. Until they were recently banned as being dangerous to health, zirconium salts were widely substituted for the aluminum compounds. With the return to the aluminum compounds, the art has sought means for overcoming the tackiness associated with the use of such products, and Kreps, U.S. Patent 3,098,795, suggests that the incorporation of a small amount of a lactic acid ester of a fatty alcohol in astringent antiperspirants reduces or overcomes such tackiness.

The object of our invention is the preparation of a highly esthetic aluminum salt-containing antiperspirant employing a novel and distinctly different ingredient, namely a saturated cyclic $C_{18}$ or $C_{20}$ alcohol, to overcome the tendency of the aluminum salt component to cause a feeling of stickiness.

As disclosed in the copending application of Bell et al., novel, normally liquid, saturated $C_{18}$ and $C_{20}$ cyclic, monohydroxy alcohols that are odorless and remain so because of their freedom from unsaturation are prepared by the catalytic reduction of the known $C_{18}$ saturated cyclic acids of Scholfield et al, Journal of the American Oil Chemists' Society, 36: 631 (1959) or the homologous $C_{20}$ ethylene adducts of Beal, U.S. Patent No. 3,005,840. The resulting $C_{18}$ and $C_{20}$ cyclic alcohol products each comprise a mixture of isomers conforming to the following respective formulas, the substituents of the $C_{20}$ isomers being very predominantly in the 1, 4 positions as shown in Formula II.

I 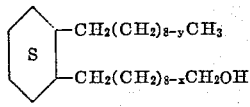

where $x+y=8$

II 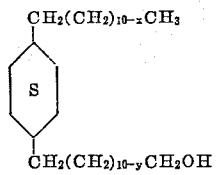

where $x+y=10$

In accordance with the object of this invention we have now discovered that the uncomfortable tacky or sticky feeling usually encountered with the use of an aluminum-containing antiperspirant is completely avoided when the antiperspirant composition also comprises a minor proportion, e.g., at least about 4 percent by weight, based on the formulation, of the aforesaid $C_{18}$ or $C_{20}$ saturated cyclic alcohols, which cyclic alcohols may conveniently be substituted in part for the conventional cetyl or stearyl alcohol components of antiperspirant compositions. In aerosol formulations containing no higher fatty acid lubricant we have also found that the saturated cyclic alcohols provide excellent lubrication for the valve mechanism of the dispenser.

The following liquid composition was metered into aerosol dispenser cans to the extent of 65 percent of the capacity thereof and the remaining capacity filled with a "Freon 12"-"Freon 114" propellant mixture.

| | Percent by wt. |
|---|---|
| Anhydrous ethyl alcohol | 79.70 |
| Diisobutyl phenoxy ethoxy dimethyl benzyl ammonium chloride (any other germicidal wetting agent could be employed in place of that shown) | .20 |
| Aluminum chlorohydroxide (50% aqueous) | 12.00 |
| Cyclic alcohol ($C_{18}$ or $C_{20}$ isomers), based on pure cyclic alcohol | 4.00 |
| Dipropylene glycol | 2.60 |
| Perfume | 1.50 |
| | 100.00 |

Following laboratory inspections by experts in the art, the above aerosol spray compositions were liberally applied by a panel of athletically active subjects that had been alerted to the possibility of stickiness. None of the panel experienced any stickiness, and all noticed an effective suppression of perspiration. No difference was detected between the $C_{18}$ and the $C_{20}$ saturated cyclic acid aerosols.

Although the invention has been illustrated by means of aerosol-applied antiperspirant compositions, it will be obvious to those skilled in the art to prepare suitable stick and cream antiperspirants incorporating our discovery.

Furthermore, although we specifically disclaim the herein employed saturated cyclic $C_{18}$ and $C_{20}$ alcohols per se, the following examples set forth the formation of the crude methyl esters of the aforesaid saturated $C_{18}$ and $C_{20}$ cyclic acids followed by the catalytic reduction of the said ester mixtures to the cyclic alcohol mixtures. Since the terminally fractionable crude mixtures, which also contain significant amounts of higher fatty alcohols, may be greatly preferred for economic reasons, it is pointed out that one may reduce either the crude or the highly pure esters. Also, as shown in Example 3, one may directly reduce the cyclic acids without first forming the corresponding esters.

*Example 1*

Purified linseed-derived $C_{18}$ saturated cyclic acid isomers (183.4 g.) were refluxed for 2 hours with 500 ml. absolute methanol in the presence of 4 ml. conc. $H_2SO_4$. Flash distillation of the reaction products at 0.1 mm. Hg pressure yielded 190.2 g. of the methyl esters of the saturated cyclic acid isomers. 190 g. of these esters and 19 g. (10% by weight thereof) of commercial copper chromite catalyst were introduced into a 500 ml. stainless steel autoclave equipped with a magnetic stirrer, heating mantle, and a gas admission means. After flushing, hydrogen was admitted at room temperature to a pressure of 2100 p.s.i. and the autoclave was then heated rapidly to 280° C. The hydrogenation was continued for 3 hours. After cooling the reacted contents, diluting with 200 ml. acetone, and filtering on a steam-heated funnel, the acetone was stripped off leaving 155 g. of crude product. Flash distillation employing a nitrogen sweep at 0.07 to 0.14 mm. pressure yielded 1.7 g. of a fraction boiling at 103°–129° C./0.15 mm. Hg, 142.9 g. of a fraction boiling at 129°–152° C., and 6.8 g. of residue. Since hydroxyl determination of the main fraction showed only 69 percent conversion to cyclic alcohol it was redistilled in a vacuum-jacketed Vigreaux column yielding 18.5 g. of a fraction boiling at 90°–129° C./0.07 mm. Hg, $n_D^{20}$ 1.4685 (66% conversion to alcohol), 64.9 g. of a fraction boiling at 129°–134° C./0.07 mm. Hg, $n_D^{20}$ 1.4685 (98.8% conversion), and a third fraction (44.8 g.) boiling at 134°–138° C., $n_D^{20}$ 1.4695. Since GLC analysis showed the last two fractions to actually be identical they were combined, $n_D^{20}$ 1.4689.

*Example 2*

The crude $C_{20}$ unsaturated cyclic acid product (501.7 g.) from the cyclization of soybean mixed fatty acids in the presence of ethylene was refluxed with 1400 ml. absolute methanol in the presence of 10 ml. conc. $H_2SO_4$. Distillation of the crude product at 0.1–0.2 mm. Hg gave 464 g. of a crude containing 46.9 percent of the isomeric methyl esters of the $C_{20}$ unsaturated (cyclohexadiene type) cyclic acids. Then 450 g. of the crude ester mixture were placed in the autoclave of Example 1 along with 45 g. of copper chromite catalyst and reacted as in the preceding example. Distillation of the crude alcohol mixture (414.3 g.) yielded 8 g. of a fraction boiling 90°–131° C./0.04 mm., 379 g. of a fraction boiling at 131°–180° C., and 32.3 g. of residue. The conversion of the esters to the $C_{20}$ saturated cyclic alcohol isomers was 96.5 percent of theory.

*Example 3*

An especially pure batch of $C_{20}$ saturated cyclic alcohol was obtained by a copper chromite catalyzed direct reduction of the $C_{20}$ cyclic acid material obtained from the addition of ethylene to pure 9,11-t,t-octadecanoic acid. A 300 ml. Aminco high pressure bomb was charged with 6.3 g. of absolutely pure $C_{20}$ cyclic acid adduct and 0.65 g. of commercial copper chromite catalyst. After the bomb was flushed and sealed, hydrogen was admitted to 2100 p.s.i. at room temperature. The bomb was then heated to 280° C. and rocked for 4¾ hours while continuing the supply of hydrogen. The cooled contents were then diluted with 20 ml. acetone and the catalyst filtered off. After flashing the acetone, there remained 5.0 g. of product which distilled as follows: 0.4 g. boiling at 108–150° C./0.07–0.1 mm., $n_D^{20}$ 1.4650; 3.4 g. boiling at 150–165° C./0.1–0.2 mm., $n_D^{30}$ 1.4668; and 0.4 g. residue. GLC analysis of the first fraction showed 92 percent $C_{20}$ cyclic alcohol, 3.4 percent stearyl alcohol, and 4.5 percent hydrocarbon. GLC analysis of the main fraction suggested only scant traces of stearyl alcohol and hydrocarbon. Conversion of the aliphatic acid to $C_{20}$ cyclic alcohol isomers was 98.4 percent of theory.

We claim:

A nontacky antiperspirant composition comprising, in parts by weight:

| | |
|---|---|
| Saturated cyclic alcohol as hereinafter defined | 4.00 |
| Anhydrous ethyl alcohol | 79.70 |
| Aluminum chlorohydroxide (50% aqueous) | 12.00 |
| Dipropylene glycol | 2.60 |
| Perfume | 1.50 |
| Quaternary ammonium wetting agent | .20 | said saturated cyclic alcohol being selected from the group consisting of the isomeric $C_{18}$ mixture represented by the formula

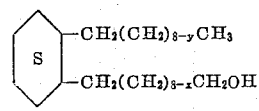

where $(x+y)=8$ and the homologous $C_{20}$ cyclic alcohols conforming to the formula

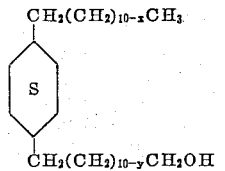

where $(x+y)=10$

No references cited.

JULIAN S. LEVITT, *Primary Examiner.*

D. R. MAHANAND, *Assistant Examiner.*